(12) United States Patent
Urban et al.

(10) Patent No.: US 8,636,208 B2
(45) Date of Patent: Jan. 28, 2014

(54) MOBILE RETAIL STORE STRUCTURE WITH INVENTORY SYSTEM

(75) Inventors: Brian J. Urban, Hyannis, MA (US); Joseph J. Wisniewski, South Plainfield, NJ (US); David Simon, Highland Park, NJ (US)

(73) Assignee: White Systems, Inc., Hyannis, MA (US)

( * ) Notice: Subject to any disclaimer, the term of this patent is extended or adjusted under 35 U.S.C. 154(b) by 45 days.

(21) Appl. No.: 12/944,092

(22) Filed: Nov. 11, 2010

(65) Prior Publication Data

US 2011/0313811 A1    Dec. 22, 2011

Related U.S. Application Data

(60) Provisional application No. 61/357,186, filed on Jun. 22, 2010.

(51) Int. Cl.
*G06K 15/00* (2006.01)

(52) U.S. Cl.
USPC .......................................... 235/383; 235/379

(58) Field of Classification Search
USPC .................. 235/379, 383; 902/30, 32, 34
See application file for complete search history.

(56) References Cited

U.S. PATENT DOCUMENTS

| | | |
|---|---|---|
| 1,156,693 A | 10/1915 | Koger |
| 2,247,340 A | 6/1941 | Webster |
| 2,363,259 A | 11/1944 | Penton |
| 3,119,638 A | 1/1964 | Sneed |
| D216,252 S | 12/1969 | Goodrich |
| 3,774,956 A | 11/1973 | Barlow |
| 3,780,852 A | 12/1973 | Weiss et al. |
| 4,655,012 A | 4/1987 | Downey et al. |
| 6,182,795 B1 | 2/2001 | Boerer |
| 6,874,981 B1 * | 4/2005 | Krawczyk et al. .............. 410/66 |
| 7,198,313 B2 | 4/2007 | Baum |

* cited by examiner

*Primary Examiner* — Karl D Frech
(74) *Attorney, Agent, or Firm* — Husch Blackwell LLP; Samuel Digirolamo; Daniel S. Cohn (57) ABSTRACT

A mobile retail store structure transportable to a plurality of different locations includes a trailer construction configured both exteriorly and interiorly for housing a plurality of storage bins wherein products and/or parts can be stored. Each trailer is a self-sufficient module which includes doors at one end of the trailer unit for entry and exit thereto, portable stairs for providing access to the entry doors, opposed side doors and associated walkways for allowing coupling to additional similarly constructed trailers, extendable canopies for providing a secure passageway between the respective coupled trailers, and a generator/HVAC system for providing heating, cooling and electrical power to each trailer unit. In one embodiment, a terminal is provided to allow a user to either browse electronically various items for selection and/or sale, or access a self-service check-out station to complete a transaction. A plurality of terminals can be coupled to communicate with a master server terminal over a wired/wireless network.

42 Claims, 7 Drawing Sheets

MOBILE RETAIL STORE STRUCTURE WITH INVENTORY SYSTEM

CROSS-REFERENCE TO RELATED APPLICATION

This application claims the benefit of priority to U.S. Provisional Patent Application Ser. No. 61/357,186, filed on Jun. 22, 2010, entitled MOBILE RETAIL INVENTORY SYSTEM, which application is hereby incorporated by reference to the extent permitted by law.

BACKGROUND OF INVENTION

The present invention relates generally to a mobile retail store and an inventory system associated therewith and, more particularly, to an improved trailer configuration configured both exteriorly and interiorly for housing mobile retail equipment including a plurality of carousels for the storage of products and/or parts and an inventory system configured for managing the inventory of the mobile retail store wherein the inventory system sends requests and orders to a central inventory server over a network.

Traditionally, retail stores have been located at fixed positions as a stand-alone store, or as part of a shopping center or mall or at some other location. As such, customers have traditionally traveled to these stores to buy merchandise. On the other hand, food kiosks, trucks and other mobile retail structures for providing food services and other limited retail services have been in use for many years. These known prior art mobile structures such as the structures disclosed in U.S. Pat. Nos. 6,182,795 and 7,198,313 provide a means of offering limited retail services at remote locations such as for selling clothing, fashions, accessories, sleeping devices and related furniture from a mobile store vehicle which is retro-fitted to function as a mobile store with racks secured along the perimeter thereof in one embodiment, and with a mechanism for selectively presenting items to a customer in a display area in another embodiment.

Although each of the known structures is suitable for its intended use, none are completely self-contained and each must be moved off-site to monitor and restock the inventory or merchandise. Furthermore, none of the known mobile stores can be coupled together in a simple, efficient manner to provide expanded retail space to fit the needs and particular applications of the user. Still further, none of the known mobile stores include an inventory system configured for managing the inventory of the mobile store wherein the inventory system sends requests and orders to a central inventory server over a network. While many improvements have been made in the known prior art structures, there is still a need and a desire for an improved mobile retail store construction particularly useful in retailing a wide variety of different types of merchandise.

Specific advantages and features of the present invention will be apparent from the attached drawings and description of an illustrative embodiment of the present invention.

SUMMARY OF INVENTION

The present mobile retail store system includes a trailer construction configured both exteriorly and interiorly for housing a plurality of storage bins wherein a wide variety of different types of products and/or parts can be stored and retrieved. Each trailer unit is a self-sufficient module which includes doors at one end of the trailer for entry and exit thereto, portable stairs for providing access to the entry doors, a side doorway and a telescopic walkway associated with both side portions of the trailer for allowing one trailer to be coupled to additional trailers, an extendable canopy associated with each side doorway for providing a secure passageway between the respective trailers, an underslung storage compartment, and a generator/HVAC unit for providing heating, cooling and electrical power to the trailer unit.

The mobile retail store of the present invention includes an interior and an exterior, a front and a back portion, opposed side portions, a forward trailer support structure for supporting the trailer unit when uncoupled from a tractor or other vehicle, and a plurality of wheels for transporting the trailer unit from one location to another, the present trailer being of sufficient length and width to accommodate within its interior a carousel-type storage system and at least one point-of-sales terminal.

A roll-up rear door is associated with the rear or back portion of each trailer for providing access to the entry doors. A roll-up side door is incorporated into opposed side portions of each trailer for providing additional access openings to the trailer and for housing a respective telescopic walkway and canopy. When one roll-up side door is opened, access from one trailer to an adjacent trailer is provided and the associated telescopic walkway and canopy bridge the gap between the two trailers. In order to expand the interior volume available for retail services, one or more trailers can be connected together through the side doorways and the telescopic walkways and canopies. In this regard, a roll-upside door is preferably associated with each opposed side portion of each respective trailer unit so that multiple trailers forming multiple modules may be combined in any sequence depending upon the particular application. The multiple trailers connected to each other with the telescopic walkways and canopies provide sufficient space between all of the connected trailers for housing one or more carousel-type storage systems as well as several point-of-sales terminals, an inventory display station or other similar types of equipment. The trailers can be individually uncoupled and returned to the warehouse for replenishment of the products and/or parts therewithin and can be moved from one location to another location at will.

In one embodiment, an electronic card swipe is provided at the rear entry door of each trailer to prevent unauthorized access to the trailer. For example, an employee may swipe their card through a reader to unlock the rear door. Alternatively, an employee may place an RFID employee badge close to a security module located adjacent the rear entry door to likewise gain access to the trailer.

A telescopic walkway coupled to and extended from a side door of one trailer is releasably connected to a side door or side portion of an adjacent trailer. The telescopic walkway of the present invention includes a left sidewall, a right sidewall, and a floor member extending therebetween. The telescopic walkway is slidably received within a suitable opening or channel associated with the side door opening or the side portion of the trailer in a conventional manner and its distal or terminal end portion is telescopically received within the side door opening or side portion of an adjacent trailer for coupling thereto. In one embodiment, an extendable/collapsible canopy is likewise provided for a secure passageway between the respective trailers. The telescopic walkway bridges the gap between two adjacent trailers. The extendable canopy structure includes a framework which is likewise collapsible into a stored state adjacent the side door opening in a conventional manner and is extendable from its stored position for use. A flexible canopy extends over the framework. Those skilled in the art will recognize that other types of secure passageways can be used without departing from the spirit and scope of the present invention.

In one embodiment, a carousel-type storage system having movable storage bins attached to a frame or track is provided within each trailer unit. Each carousel may include a number of compartmented baskets or other holding means that move along the tracks or other means by an electrically or hydraulically operated motor. The carousel-type storage system is controlled from a remote work station having an operator's terminal. The computer memory in the operator's terminal remembers where each tote bin is in the system and will retrieve the desired coded bin upon command. A conveyor assembly coupled to the movable storage bins provides access to each storage unit. In a further embodiment, a check-out register controls access to items stored within the storage bins by means of the motor-driven conveyor assembly, thereby retrieving a particular item from a particular storage bin upon request. The carousel can be remotely diagnosed and controlled either by the check-out register or by a master server connected to the local terminal over the network. The check-out register may be located adjacent the carousel and includes a computer which may be configured similar to known microprocessor-based computers and has a CPU, a plurality of storage devices and an I/O interface. The storage devices may include program memory, RAM, non-volatile memory (such as ROM, EEPPROM, etc.), and any or a combination of the mass storage devices known conventionally in the art, such as floppy disk, optical disk, hard disk and/or tape cartridge drives, plus appropriate device drivers. The computer can communicate via a network interface with devices, such as an inventory system or supervisor station, on the network. The network may be any one or a combination of LAN, WAN, wireless and other networks.

In one embodiment, a point-of-sales terminal is provided at the check-out station for integration therewith for allowing a customer to browse products electronically and select various products for purchase, review or check out. The check-out station processes customer specific orders and automatically sequences the carousel to the purchased products. As shown in the exemplary workflow diagram of FIG. 5, once customers select various items for purchase, the check-out station would automatically retrieve these items from the storage bin for check out, and then the store clerk would tally the price of the items to be purchased by entry of the price into a typical cash register which is integrated into a point-of-sales terminal. The clerk may be identified by a swipe card, a radio frequency ID FOB, or a pin number. Self-serve checkout stations can likewise be provided to allow the customer to scan the bar codes that appear on the items to be purchased. The station may also provide other user-friendly mechanisms such as a series of menu choices on a touch-screen monitor, and voice prompts to guide shoppers through the transaction process. It may also assist with entry of product code for items not possessing bar codes.

The point-of-sales terminal includes a touch screen display, a scanner-scale and a payment module. A payment module includes a reader for credit cards, debit cards, store cards and the like. The transaction record is wirelessly transmitted to the central server in real time over the network. If the transmission of the transaction record is not completed due to a signal failure, the transaction record is temporarily stored in a local storage device and then sent to the central server once the connection is recovered. In one embodiment, the check-out station includes a computer which can communicate via a network interface with devices, such as an inventory system or supervisor station, on the network.

A mobile terminal is also provided to allow customers to directly access and browse through the items for sale or selection, or access to a self-service check-out point-of-sales terminal to complete a transaction. The mobile terminal is located within the trailer to provide customers with easy access to those systems. The mobile terminal includes a processing unit, a storage device, a touch screen, a credit card type reading device and wireless devices, such as wireless/cellular telephones, satellite telephones, or other wireless handsets, as well as portable computing devices capable of wireless communication. A plurality of terminals can be coupled to communicate with the master server terminal over a wired/wireless network. The processing unit controls the basic functions of the mobile terminal as dictated by programs available in the program storage/memory. The program storage/memory may include an operating system and program modules for carrying out functions and applications on the mobile terminal. The processor is also coupled to a user-interface element associated with the mobile terminal. The user-interface of the mobile terminal may include, for example, a display such as a liquid crystal display, a touch screen keypad, a speaker, and a microphone.

In one embodiment, an optional customer oriented trailer may be provided. A plurality of mobile terminal stations mounted to the interior wall of the customer trailer enable customers to access either the items for sale or selection or a check-out module. Each mobile terminal includes a processing unit, a storage device and a touch screen. A plurality of mobile terminals can be coupled to communicate with the master server terminal over a wired/wireless network.

Powering the trailer unit of the present invention is a generator located at the front portion of each trailer. The generator may be housed generally outside the confines of the interior of the trailer in order to reduce interior noise and provide better ventilation for exhaust.

In one embodiment, the present trailers are integrated with a company's Enterprise Resource Planning ("ERP") system which is used to manage internal and external resources, including tangible assets, financial resources, materials and human resources. Such ERP system may be accomplished via "cloud computing," utilizing various interconnecting "cloud components" communicating with each other over application programming interfaces, and preferably over web services. As such, processing duties may be shared among various computing modules. Additionally, individual companies are not required to develop, own and maintain their own physical infrastructures, and instead utilize a third party's existing ERP services. Sharing "perishable and intangible" computing power among multiple "subscribers" and "renters" can improve utilization rates, while requiring a much lower initial outlay of funds from such users. In implementing such cloud computing, encrypted data is preferably stored in secured web servers.

A present trailer unit located at a first location (which may include a plurality of trailers) and a present trailer unit located at a second location (which may include only a single trailer) are preferably connected via a web server to an ERP system via LAN, WAN, wireless connection, satellite, modem and/or other networks. Specifically, the point-of-sale terminals are either individually directly linked with the ERP system, or are linked to a master terminal which is in communication with the ERP system. Other systems installed in the present trailers, such as check-out stations and product picking software, may also be integrated into the ERP system either individually or via a master connection from such trailer. The company may then track each mobile location's stock, purchases, returns, customers, employees, etc. by mobile trailer and physical location, and may initiate new stock shipments, or may send additional or replacement on-site trailers to any location. Portal users may also interact with the web server. Vendors may interact with the company's web server and/or the web server may contact vendors to request delivery of products to customer point of use locations and consigned stock locations.

These and other objects and advantages of the present invention will become more apparent to those skilled in the art after considering the following detailed specification taken in conjunction with the accompanying drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts or structure.

DETAILED DESCRIPTION

Figure 1:
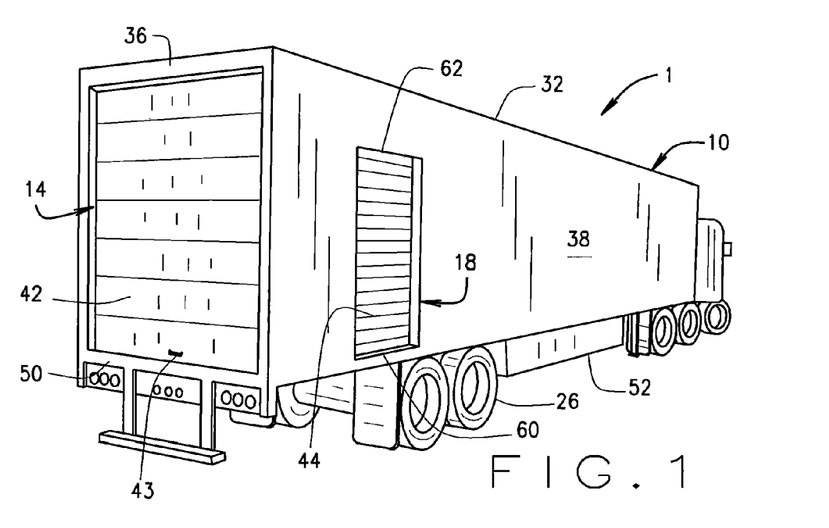
FIG. 1 is a perspective view of an on-site mobile trailer unit constructed in accordance with the teachings of the present invention with its doors, walkways, canopies and staircase shown in their closed, retracted and/or storage position.

Referring to the drawings more particularly by reference numbers wherein like numerals refer to like parts, the reference numeral 1 illustrated in FIG. 1 designates generally one embodiment of a mobile retail store structure constructed according to the teachings of the present invention. Although the present mobile structure discussed herein is directed to a stand alone trailer configuration or body section releasably attachable to a conventional tractor or other truck type vehicle via a conventional "fifth wheel" type arrangement as illustrated in FIG. 1, it is recognized and anticipated that the present invention can be incorporated into any trailer or cargo compartment type structure including trailers pulled by a separate vehicle, or trailers, or other storage or compartment type units integrally associated with a vehicle and having its own integral means of propulsion such as an RV type vehicle, a bus, or a truck having its own storage compartment integrally associated therewith. In this regard, the present invention is adapted for use in conjunction with all such trucks, trailers and/or cargo type transport vehicles that include at least one door structure for entering the cargo or trailer compartment as will be hereinafter explained. As used in the present application, the term "trailer body" includes a trailer body, a truck body, a cargo type compartment, or any other body structure which can be utilized as explained and defined herein.

As illustrated in FIGS. 1-4, the present mobile retail structure 1 includes a trailer body or body section 10 configured both exteriorly and interiorly for housing a plurality of carousels 12 (FIGS. 4A and 4B) wherein merchandise and/or parts can be stored. The trailer body 10 is a self-sufficient module which includes a first entry means or rear doorway 14 (FIGS. 2A and 3A) at the rear end of the trailer body 10 for entry and exit thereto, portable stairs 16 for providing access to the rear doorway 14, a second entry means or side doorway 18 (FIGS. 2A, 3A, 4A and 4B) at one side of the trailer body 10 for entry and exit thereto, a telescopic walkway 20 (FIGS. 2A and 3A) associated with the side doorway 18 for allowing coupling to additional trailers, an extendable canopy 22 (FIGS. 2A and 3A) for providing a secure passageway between the respective trailers, a third entry means or side doorway 56 (FIGS. 2B, 3A and 4B) at the other side of the trailer body 10 for entry and exit thereto, a telescopic walkway and extendable canopy associated with side doorway 56, and a generator/HVAC unit 24 (FIG. 2B) for providing heating, cooling and electrical power to the overall trailer 1. The trailer body 10 can be any size flat floor trailer or other cargo compartment structure as illustrated in FIG. 1. If a 53' flat floor trailer is utilized, a 24 bin horizontal carousel can be housed within the interior of the trailer body as best illustrated in FIGS. 4A and 4B. In one embodiment, trailers having only rearwardly positioned wheels such as the rear wheels 26 illustrated in FIGS. 1-4 also commonly provide some type of forward support structure such as the wheel dolly 25 which is movable from the depending supportive position illustrated in FIGS. 2A and 2B to a retracted storage position when the trailer is being supported and transported by a tractor as illustrated in FIG. 1.

Figure 4A:
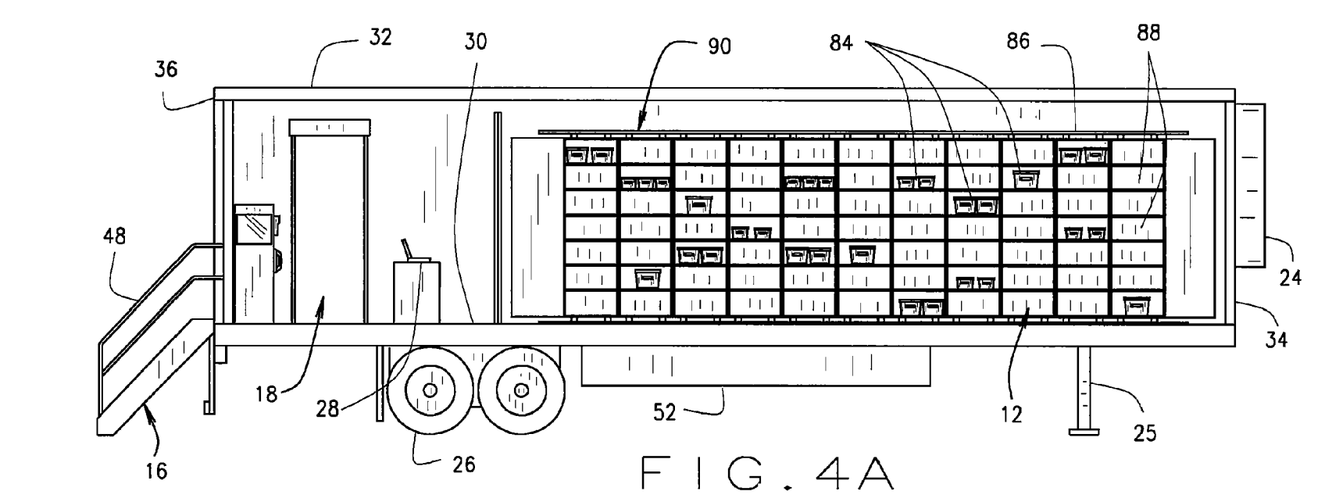
FIG. 4A is a side elevational cutaway view of one embodiment of the inside of the present mobile trailer unit showing a retail terminal and one embodiment of a plurality of carousel bins.
Figure 4B:
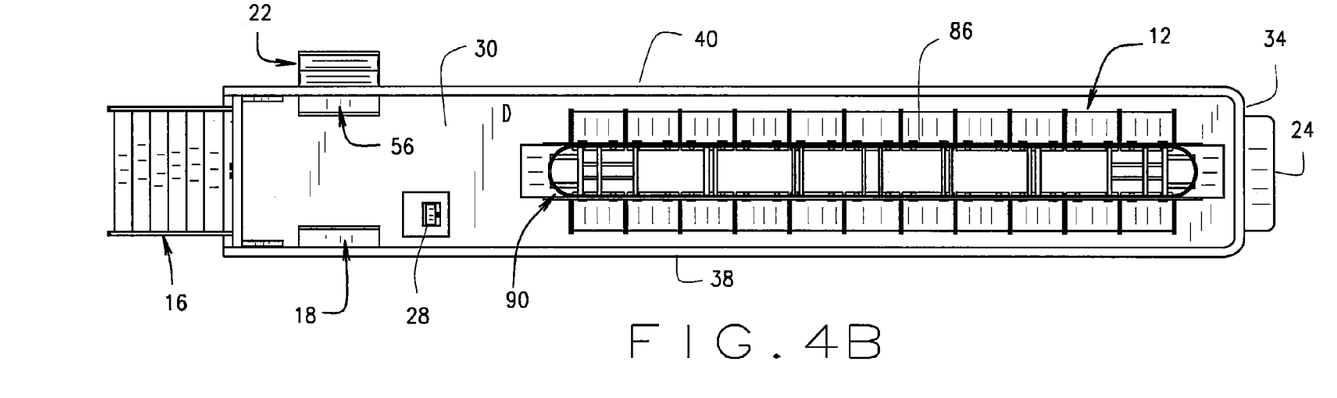
FIG. 4B is a top plan form cutaway view of FIG. 4A.

The mobile retail structure 1 of the present invention would be of sufficient length and width to accommodate within its interior a carousel-type storage system 12 and at least one point-of-sales terminal 28 as best illustrated in FIGS. 4A and 4B. The trailer body 10 has an interior space surrounded and defined by an enclosure wall that includes a floor 30, a roof 32, a front wall 34, a rear wall 36, and opposing right and left side walls 38 and 40 as illustrated in FIGS. 2A, 2B, 4A and 4B.

Roll-up doors 42 and 44 are provided to secure the rear doorway 14 and the side doorway 18. Roll-up doors 42 and 44 are illustrated as including a plurality of hinged panels having rollers riding inside a pair of rails (not shown). The roll-up doors 42 and 44 move on the rollers (not shown) associated with tracks and are elevated along the tracks to provide access to the doorways 14 and 18 as best illustrated in FIGS. 1 and 2.

The roll-up doors 42 and 44 also include seal means for sealing the interior area from the external environment. A lock mechanism such as lock 43 illustrated in FIG. 1 is provided to secure the rear roll-up door 42 in its closed position over the rear doorway 14. A similar locking mechanism can be associated with either the interior or the exterior of side roll-up door 44 to secure the side doorway 18 and prevent entry until needed. The rear wall 36 also includes one or more entry doors 46 which are exposed when the rear roll-up door 42 is opened. The rear portion of the present trailer unit likewise includes a removably attachable staircase 16 and a pair of handrails 48 that are sized to be a comfortable stairway for people wishing to enter the trailer interior space. The staircase 16 includes a plurality of steps that extend substantially all the way from the bottom edge 50 of doorway 14 to the ground. When it is desired not to use the staircase 16, the staircase 16 is removed from the trailer body 10 and can be releasably maintained in a stored mode to await future use within a storage compartment 52 mounted underneath the floor structure 30 of the trailer body 10 as best illustrated in FIGS. 1, 2A and 2B. Alternatively, the staircase 16 can be stored inside the trailer body 10.

Figure 2A:
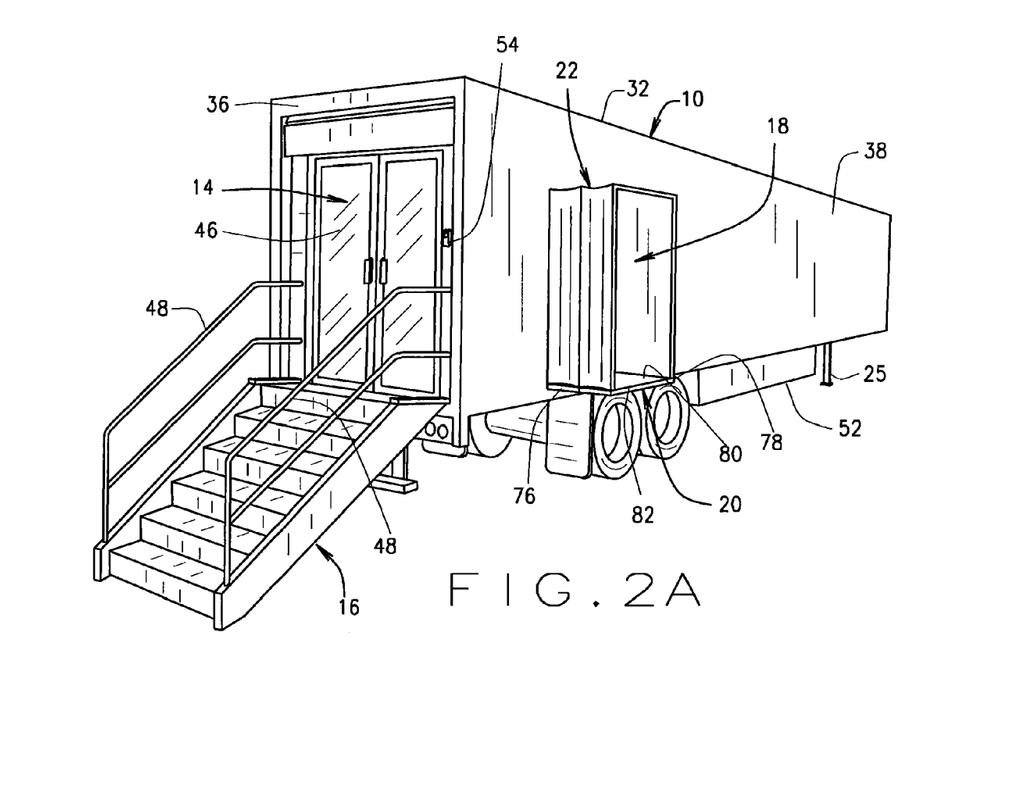
FIG. 2A is a perspective view of the present mobile trailer unit of FIG. 1 shown in its operating position in accordance with one embodiment of the present invention.
Figure 2B:
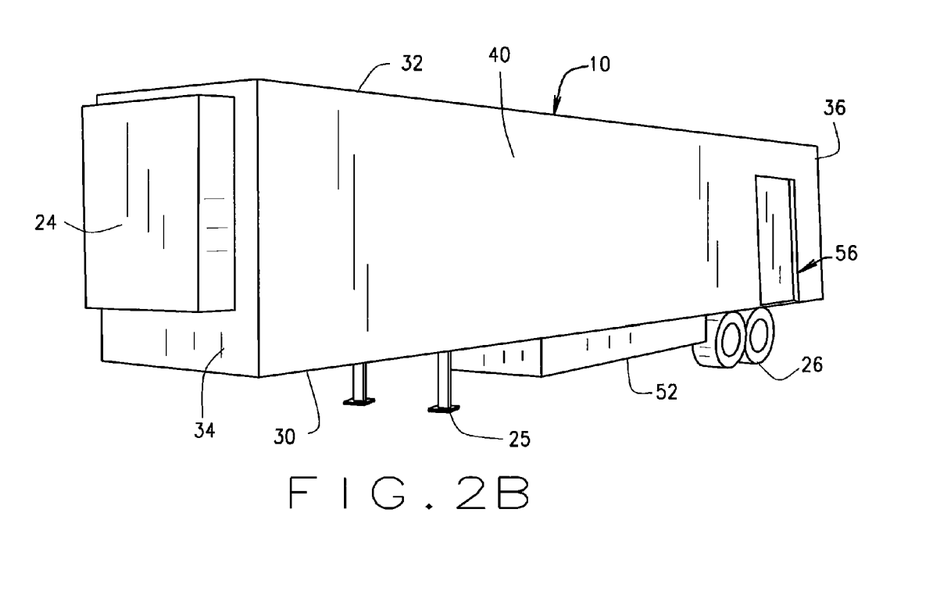
FIG. 2B is a perspective view of the opposite end of the present mobile trailer unit of FIG. 2A.

In one embodiment, when closed, the entry doors 46 can be secured by a securing means such as an electronic card swipe 54 illustrated in FIG. 2A. The card swipe 54 can be provided at the entry doors 46 of each trailer to prevent unauthorized access to the trailer. For example, an employee may swipe their card through a reader 54 to unlock the entry doors 46. Alternatively, an employee may place an RFID employee badge close to a security module located adjacent the entry doors 46 to likewise gain access to the trailer body 10. Those skilled in the art will recognize that other types of doors and access means can be used without departing from the spirit and scope of the present invention.

Figure 3A:
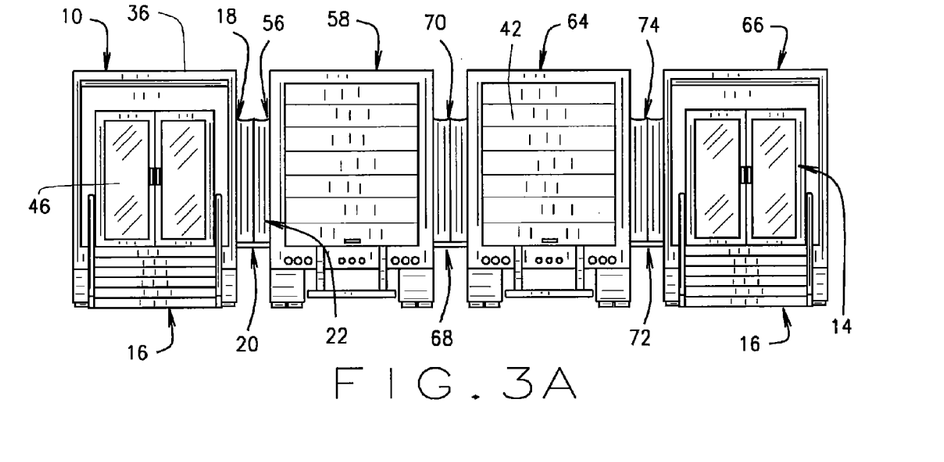
FIG. 3A is a rear elevational view of a plurality of the present mobile trailer units of FIGS. 1 and 2 connected to one another with their telescopic walkways and canopies deployed in their operational mode.
Figure 3B:
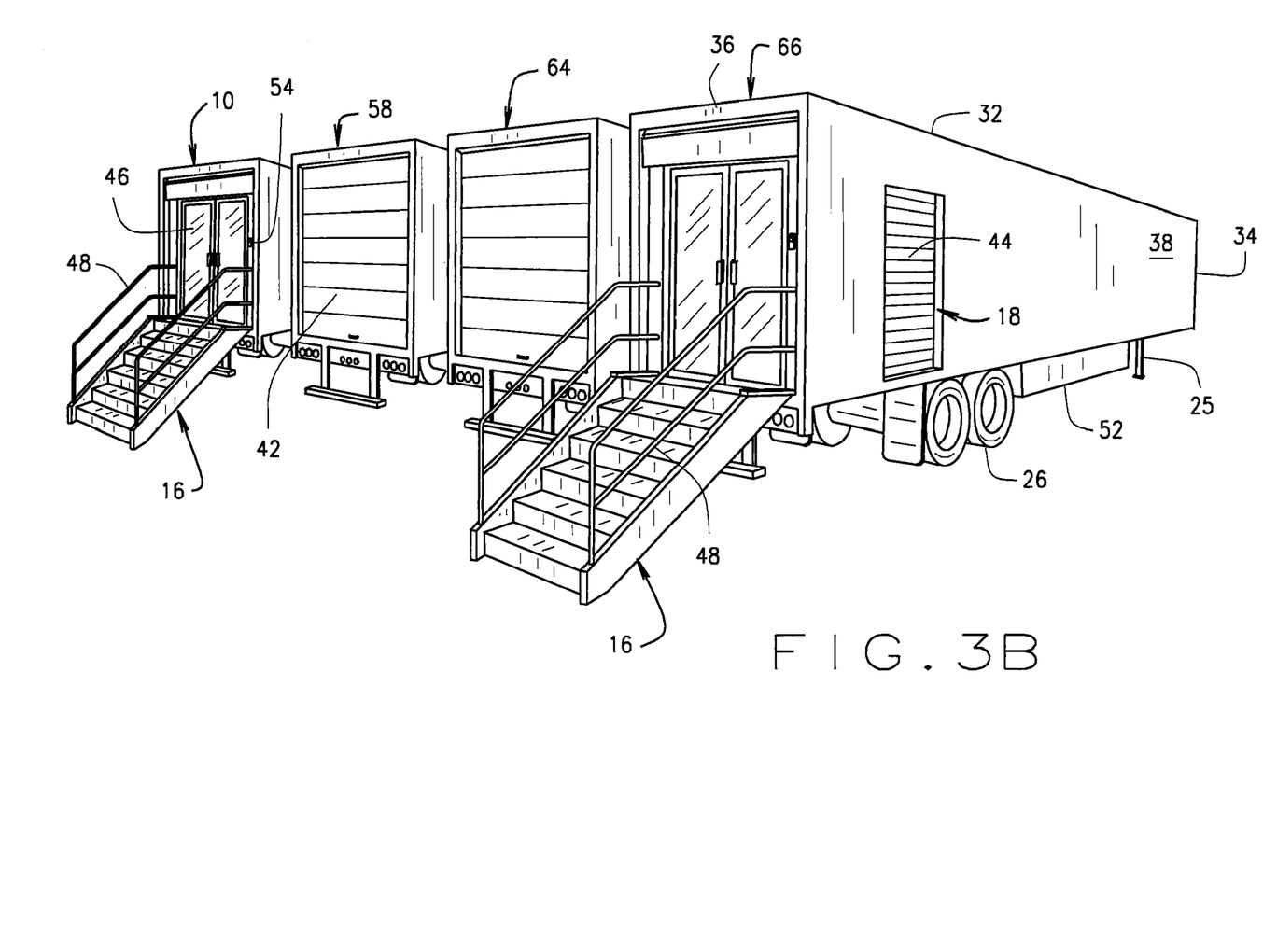
FIG. 3B is a perspective view of FIG. 3A.

The side wall 38 of trailer the body defines a side doorway 18 for connection with a corresponding side doorway 56 associated with a similar trailer body 10 positioned adjacent thereto such as trailer body 58, if used, as best illustrated in FIGS. 3A and 3B. In the embodiment illustrated in FIGS. 3A and 3B, side doorway 18 is associated with the right side wall of trailer body 10 and side doorway 56 is associated with the left side wall of trailer body 58. In this regard, for obvious reasons, it is preferred that a side doorway such as doorways 18 and 56 be associated with each opposite side wall of each of the present trailer bodies 10. In this regard, each trailer body 10 would include a pair of side doorways 18 and 56 positioned and located in opposed relationship to each other, the side doorways 18 and 56 being substantially identical in construction as will be hereinafter explained. In the embodiment illustrated in FIGS. 1, 2A and 3A, the right side doorway 18 extends substantially along the height of the right side wall 38 between the bottom end 60 of the side doorway 18 adjacent the floor 30, and the top end 62 as best illustrated in FIG. 1. The roll-up side door 44 is coupled to the right side doorway 18 similar to roll-up door 42 for providing security to the trailer body 10. The roll-up side door 44 is incorporated into the trailer body 10 for housing the walkway 20 and canopy 22 illustrated in FIGS. 2A and 3A. When the roll-up side door 44 is opened, access from one trailer body 10 to an adjacent trailer body 58 is provided and the telescopic walkway 20 bridges the gap between the two trailer bodies 10 and 58 as illustrated in FIGS. 3A and 3B. In order to expand the interior volume available for retail services, one or more trailers 10, 58, 64, 66 can be connected together through the telescopic walkways 20, 68, 72 and canopies 22, 70, 74, as best shown in FIG. 3A. It is recognized and understood that the trailers 10, 58, 64 and 66 are substantially identical in construction as described with respect to trailer body 10 except that the interior of each respective trailer body may be configured differently. In similar fashion, it is recognized and understood that the walkways 20, 68 and 72, and the canopies 22, 70 and 74 are likewise substantially identical in construction as will be hereinafter explained.

As can be seen from FIGS. 3A and 3B, multiple trailers or trailer bodies forming multiple modules may be combined in any sequence depending upon the particular application. The multiple trailer bodies connected to each other with the telescopic walkways and canopies provide sufficient space between all of the connected trailers for housing one or more carousel-type storage systems as well as several point-of-sales terminals, an inventory display station or other similar types of equipment as best illustrated in FIGS. 3-4. The present trailers can be individually uncoupled and returned to the warehouse for replenishment of the product therewithin and can be moved from one location to another location. The interior configuration of each individual trailer body 10 is best illustrated in FIGS. 4A and 4B, although the interior of each trailer body 10, 58, 64 and 66 can be configured differently as desired depending upon the particular application.

As illustrated in FIGS. 3A and 3B, a telescopic walkway 20, 68, 72 coupled to and extended from a side door of one trailer is releasably connected to an adjacent trailer body in the vicinity of its corresponding side door. The telescopic walkway 20 of the present invention as best illustrated in FIG. 2A includes a left side wall 76, a right side wall 78, and a floor member 80 extending therebetween. The distal end portion 82 of the telescopic walkway 20 is telescopically received within an opening or otherwise attached to the floor, side wall or other structure associated with an adjacent trailer body such as trailer body 58 in registration with the side doorway 56 for coupling thereto. This coupling allows for a smooth transition and passageway from one of the present trailers to another. In one embodiment, an extendable canopy 22, 70, 74 is provided for a secure cover between the respective trailer bodies 10, 58, 64, 66. The canopy structure 22, 70, and 74 includes a framework that is both collapsible into a stored position and extendible into an expanded position for use. A flexible material or other suitable covering extends over the framework to complete the canopy structure. It is also recognized and anticipated that the collapsible and expanded canopies 22, 70 and 74 can be of an accordian style structure. The canopy structure is housed in its stored position within a channel, cavity, recess or other known means (not shown) adjacent the respective side doorways 18 and 56 in a conventional manner. The roll-up doors 42 and 44, staircase 16 and telescopic walkways 20, 68, 72 are typically made of metal or any other suitable sturdy material. In addition, the telescopic walkways 20, 68, 72 may include bracing or other reinforcement members (not shown) necessary to support the weight of customers and merchandise that travel on and through the walkways 20, 68, 72. Those skilled in the art will recognize that other types of secure passageways can be used without departing from the spirit and scope of the present invention.

As illustrated in FIG. 2B, the left side wall 40 includes the left side doorway 56 for connection with a corresponding right side doorway 18 associated with an adjacent trailer as previously explained and as illustrated in FIG. 3A. In this regard, the additional trailer can be positioned on either side of the initial trailer. In another embodiment, two or more additional trailers can be connected together through the telescopic walkways and canopies as explained above. The present trailers are lined up adjacent to each other and positioned so that the side doorway 18 associated with the right side wall 38 of one trailer is aligned with the side doorway 56 associated with the left side wall 40 of the adjacent trailer. Each trailer connected to each other can provide a separate business area. As illustrated in FIGS. 1, 2B and 4B, the right side doorway 18 and left side doorway 56 are preferably mirror-images of each other in design and operation.

The use of the terms "right side" and "left side" are intended only to help in the clear description of the present invention and are not intended to limit the structure, positioning and/or operation of the side doorways, walkways and/or canopies in any manner. In the above descriptions of embodiments of the present mobile retail structure, the terms "door" and "side door" may each be interpreted to mean either a single door or a plurality of doors.

Powering the on-site retail trailer 1 of the present invention is a generator located at the front portion 24 of the trailer. The generator will supply electrical power for operation of all systems housed within the trailer and may be housed with the HVAC system and outside the confines of the interior of the trailer in order to conserve space, reduce interior noise and provide better ventilation for exhaust.

Further, the overall dimensions of the present mobile retail structure as well as the specific shape and configuration of the various sections thereof are also subject to wide variations and may be sized and shaped into a wide variety of different sizes and configurations so as to be compatible with the size and shape of the particular trailer, compartment, truck bed or other structure onto which the present structures may be mounted, or to conform with any space limitations associated therewith out impairing the teachings and practice of the present invention.

In one embodiment, a carousel-type storage system 12 having movable storage bins 84 attached to a frame or track system 86 is provided within the present trailer as best illustrated in FIGS. 4A and 4B. Each carousel may include a number of compartments, compartmented baskets, or other storage holding means that are parallel to each other and are moved along the track system by an electrically or hydraulically operated motor (not shown). In another embodiment, the carousel-type storage system 12 may include a plurality of carousel storage bins 88 which are vertically stacked and spaced from one another, each of which are rigidly fixed to each other and rotationably movable about a central support shaft or other known means. Other carousel bin options are likewise known and adaptable for use in the present storage system 12 depending upon the types of products and/or parts to be housed therein.

The carousel-type storage system 12 is controlled from a remote work station having an operator's terminal. This work station can be a check-out station, a supervisor station, a point-of-sales terminal or other station as will be hereinafter explained. The computer memory in the controlling terminal remembers where each bin is in the system and will retrieve the desired bin upon command based upon either a code associated with the item stored in the bin, or the bin itself. A conveyor assembly 90 coupled to the movable storage bins provides access to each storage unit. In a further embodiment, the operator's terminal can be integrated with a point-of-sales or check-out terminal 28 whereby items stored within the storage bins 84 can be retrieved by means of the motor-driven conveyor assembly 90 upon request when the item is entered into the terminal 28. Because any selected storage bin of any of the storage carousels may be moved or rotated into a check-out position, the transport mechanism is able to access any selected storage bin.

Figure 6:
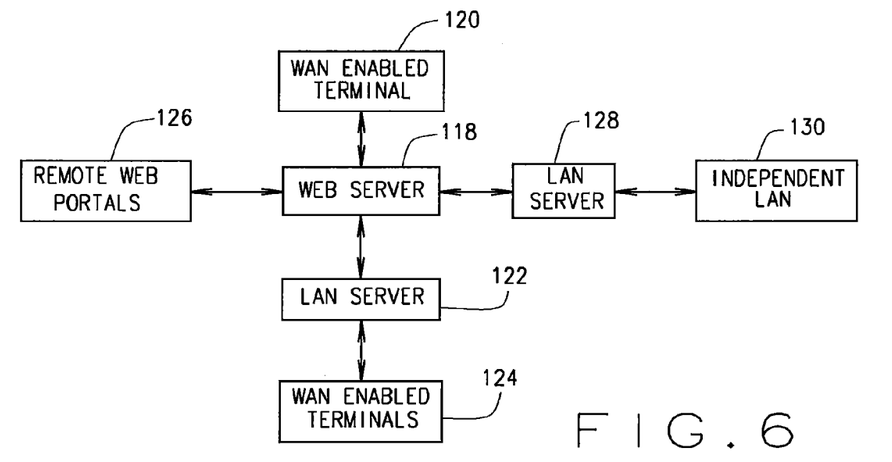
FIG. 6 is a block diagram of an exemplary networking structure which may be utilized with the present mobile trailer units.

The storage system 12 can be remotely diagnosed and controlled either by the check-out station or by a master server connected to the local terminal over the network. The check-out station 28 located adjacent the storage system 12 includes a computer which may be configured similar to known microprocessor-based computers and has a CPU, a plurality of storage devices and an I/O interface. The storage devices may include program memory, RAM, non-volatile memory (such as ROM, EEPROM, etc.), and any or a combination of the mass storage devices known conventionally in the art, such as floppy disks, optical disks, hard disks and/or tape cartridge drives, plus appropriate device drivers. The computer can communicate via a network interface with devices such as an inventory system or supervisor station on the network. The network may be any one or a combination of LAN, WAN, wireless and other networks, such as illustrated in FIG. 6. All such systems, including the point-of-sale, inventory, and customer terminals (discussed below) may be implemented on an on-board computer system. Those skilled in the art will also recognize that any carousel-type storage system can be used with the present retail store system without departing from the spirit and scope of the present invention.

In one embodiment, a point-of-sales terminal 28 is provided with and can be integrated into the check-out station as best illustrated in FIGS. 4A and 4B. Each point-of-sales terminal 28 is provided to register and record data related to items offered for selection and to manage the sale or withdrawal of items from the store. The check-out station processes customer specific orders and automatically sequences the carousels to the purchased products. As shown in the exemplary workflow diagram of FIG. 5 which is discussed in detail below, once customers select various items for purchase, the point-of-sales terminal would automatically rotate or move the appropriate carousel bins holding those selected items to the check-out station for retrieval therefrom. The store clerk would then tally the price of the items to be purchased by entry of the price into a conventional terminal such as a cash register which is or may be integrated into a point-of-sales terminal. The clerk may be identified by a swipe card, radio frequency ID FOB, or a pin number. Self-serve checkout stations can also be provided to allow the customer to scan the bar codes that appear on the items to be purchased as will be hereinafter further discussed. The station may also provide other user-friendly mechanisms such as a series of menu choices on a touch-screen monitor, and voice prompts to guide shoppers through the transaction process. It may also assist with entry of product codes for items not possessing bar codes.

A point-of-sales terminal may include a touch screen display, a scanner-scale and a payment module. A payment module includes a reader for credit/debit cards, charge cards and/or store cards. Such transaction record is wirelessly transmitted to the central server in real time over the network. If the transmission of the transaction record is not completed due to a signal failure, the transaction record is temporarily stored in a local storage device and then sent to the central server once the connection is recovered. In one embodiment, the checkout station includes a computer which may be configured similar to known microprocessor-based computers and has a CPU, a plurality of storage devices and an I/O interface. The computer can communicate via network interfaces with devices such as an inventory system or supervisor station on the network. The network may again be any one or a combination of LAN, WAN, wireless and other networks.

In one embodiment, an optional customer trailer is provided. A plurality of customer terminal stations mounted to the interior wall of the customer trailer enable customers to access either the inventory of items offered for sale or selection, or to access a self service check-out terminal to complete a transaction. Each customer terminal includes a processing unit, a storage device and a touch screen. A plurality of mobile terminals can be coupled to communicate with the master server terminal over a wired/wireless network. A "mobile," or "customer" terminal 142, such as that shown in FIG. 9 and discussed below, is thus preferably provided to allow customers to directly either browse electronically through the items for sale or selection or provide access to a self-service checkout point-of-sales terminal to complete the transaction. The customer terminal 142 is preferably located within the trailer to provide customers with easy access to such systems. Alternatively, a customer terminal 142 may be provided outside of a trailer 1 for allowing outside customers to browse electronically through the items for sale. A plurality of such terminals can be coupled to communicate with a master server terminal over wired/wireless network.

Figure 5:
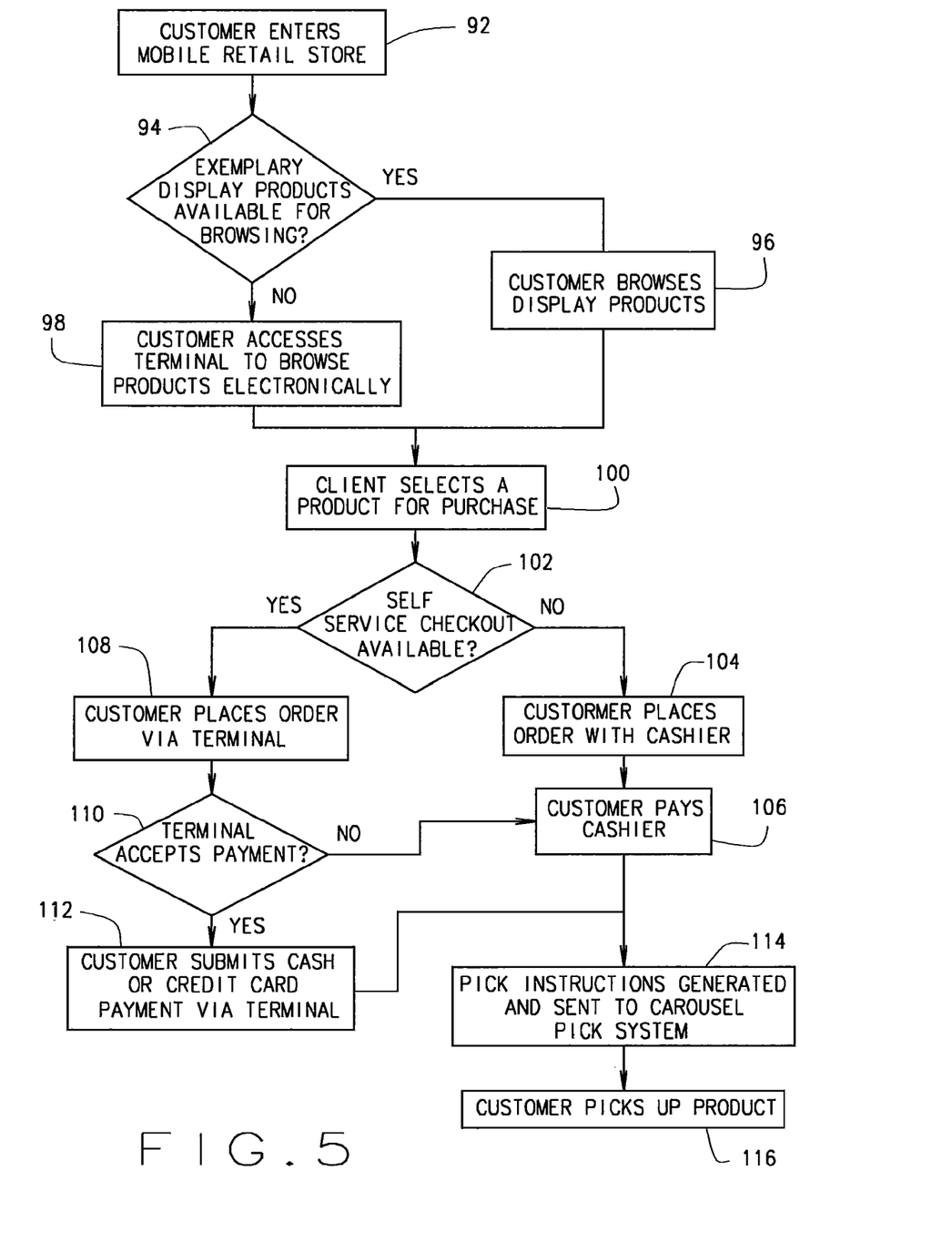
FIG. 5 is a flow chart of an exemplary customer experience and ordering process.

FIG. 5 illustrates a flow chart of the process by which a customer terminal 142 may be used to conduct a transaction within a trailer 1. At step 92, a customer enters the mobile retail trailer. In one trailer embodiment at stop 94, the available products may be physically on display for the customer to browse in person. Multiple trailer units, such as those illustrated in FIGS. 3A and 3B with multiple interconnected trailers, have increased internal volume and are therefore more likely to have sufficient space to display products. In such an embodiment, customers may browse the products on display at step 96. In an alternate embodiment, such as that shown in FIG. 2A, a trailer 1 may have less interior volume and insufficient space to put products on display at step 94. In such an embodiment, a customer may access a customer terminal at step 98 to browse photos and information relating to the products available.

After either method of browsing products at steps 96 and 98 is employed, a customer may select a product for purchase at step 100. In one embodiment, the customer terminal 142 may not be enabled to allow self checkout at step 102, in which case the customer places an order for the selected product with a cashier at a point-of-sales terminal 28 at step 104. The customer would then pay the cashier at step 106. In an alternate embodiment, customer terminal 142 may allow the user to select a product directly from the terminal for self check-out at step 102. In such an embodiment, the user places an order for the selected product via the customer terminal 142 at step 108. Preferably, the customer terminal 142 allows customers to pay via the customer terminal 142 itself at step 110. Where the customer terminal 142 accepts payment directly, the customer inserts cash, a credit card or another form of payment into an appropriate payment receiving module as is well known in the art at step 112.

Whether payment is submitted to a cashier at step 106, of via customer terminal 142 at step 112, carousel pick instructions are then generated by the respective point-of-sales terminal 28 or customer terminal 142 and are sent to the carousel pick system at step 114. The carousel system 12 is then moved to the check-out station where the customer retrieves the product from the carousel system at step 116.

In a further alternative embodiment, a trailer-carousel-terminal system as discussed above may be used for purpose other than retail sales. For example, a trailer could be positioned at a construction site to efficiently store parts and/or equipment for the project thereby providing workers fast access to the same. A worker in need of a specific type of bolt or tool could enter the trailer, select the type of product that is needed, and pick it up from the carousel system seconds later. In such a system, it is preferable that no payment system be implemented. Instead, an item check-out system may be implemented whereby a record is kept as to who took the item from the carousel at a specific time on a specific day. A return system would also be implemented when the item is returned to the storage bin.

As mentioned above, the customer terminal 142 and/or point-of-sales terminal 28 can communicate via network interfaces with a web server via a network that may be any one or a combination of LAN, WAN, wireless and other networks as illustrated in FIG. 6. In the exemplary network of FIG. 6, web server 118 is in communication with WAN enabled terminals 120 at a first trailer unit location, as well as to WAN enabled terminals 124 via LAN server 122 at a second trailer unit location. Web server 118 may also be connected to remote web portals 126 directly, such that customers may access product information and place orders from their own personal computers or customer terminals 142 separate from the present trailer 1. An independent LAN 130 utilizing a LAN server 128 may be independent from other networks and web server 118, operating as a self-contained retail system, or may be connected to web server 118 as shown in FIG. 6.

Figure 7:
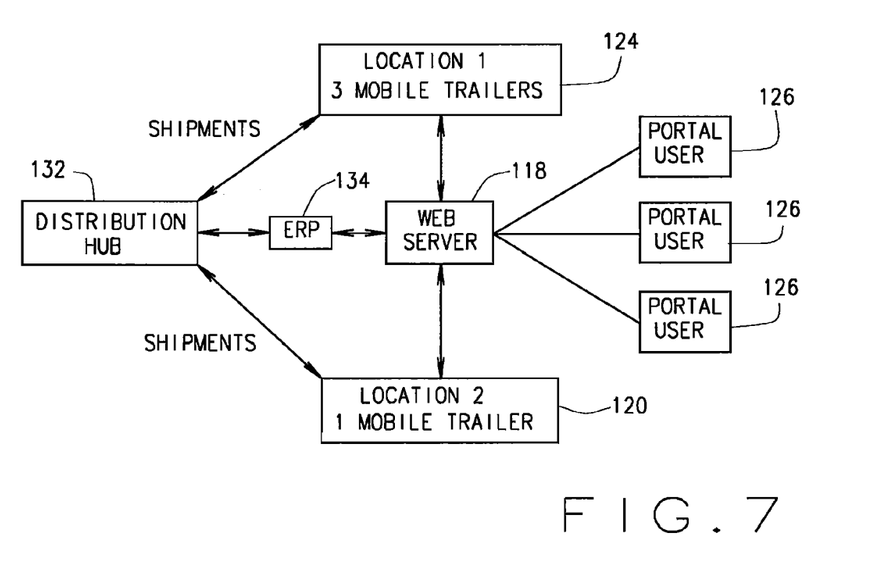
FIG. 7 is a block diagram of an exemplary communications architecture connecting a distribution hub with various mobile trailer units at different locations.

As illustrated in FIG. 7, the first and second trailer locations 120, 124 communicate with web server 118, and may transmit information relating to transactions, cash on hand, stock levels, customer data and other relevant data. Web server 118 then communicates such information to an Enterprise Resource Planning ("ERP") system 134, which may in turn communicate instructions to distribution hub 132. For example, where ERP system 134 receives stock information from either the first or second trailer location 120, 124 and determines that a stock level is low, ERP system 134 instructs distribution hub 132 to initiate a shipment to the appropriate trailer location. Such a shipment may be a mere restocking shipment, or may be an entirely new replacement trailer 1 designed to take the place of the in-use trailer 1 with low stock. The low stock trailer 1 would then be delivered back to the distribution hub 132 for restocking and reuse.

Additionally, ERP system 134 may also use information relating to stock levels to determine which specific products and/or product types are popular in specific locations. ERP system 134 is thereby capable of restocking trailer units in certain areas with higher quantities of a specific product or product type. Further, where the ERP system 134 determines that sales are very high in a specific location, it may instruct distribution hub 132 to send an additional trailer 1 to supplement the present trailers 1 already on site. As discussed above in connection with FIGS. 3A and 3B, such additional trailer connects with the existing trailers 1 already on site to increase the total internal volume of that mobile retail location.

Web server 118 may also communicate with remote portal users 126. A remote portal user 126 may thereby place an order through web server 118, which would forward the order to one of the trailer locations 120, 124 to prepare the product for customer pickup. Alternatively, web server 118 may instruct distribution hub 132 to ship the remote portal user 126 a product directly.

Figure 8:
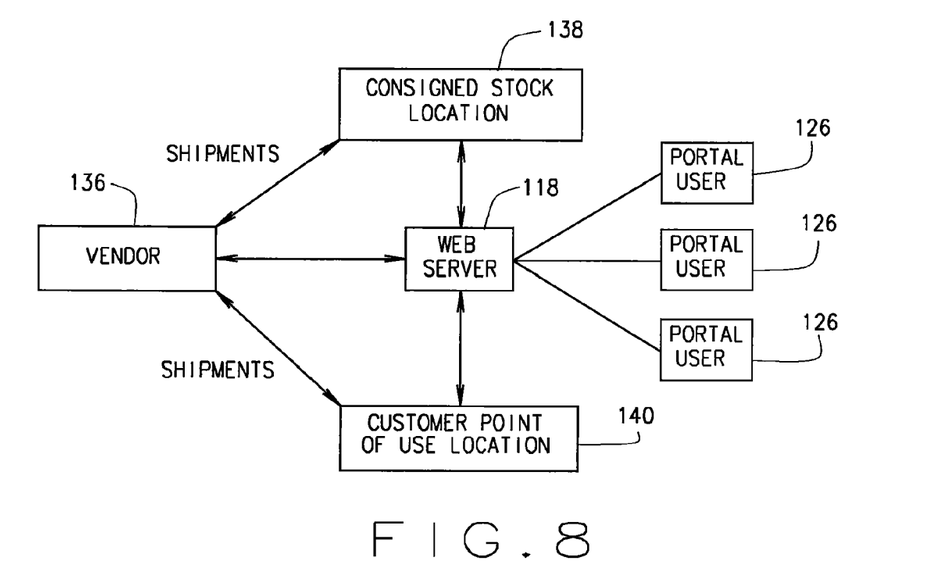
FIG. 8 is a block diagram of an exemplary communications architecture connecting a vendor with various mobile trailer units.

As shown in FIG. 8, web server 118 may also interact directly with a vendor 136, which may be an outside vendor. As transactions are made and stock is sold from locations, such as consigned stock location 138 or customer point of use location 140, web server 118 forwards such transaction information to vendor 136 which may initiate its own restocking shipments to such locations 138, 140. Web server 118 may also still interact with portal users 126 as discussed above.

Figure 9:
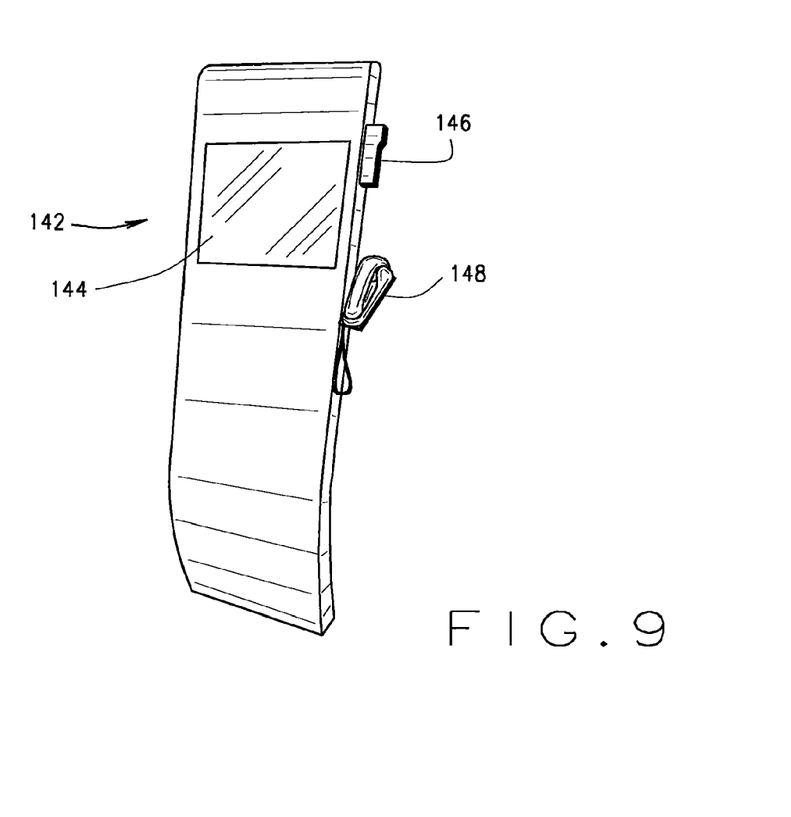
FIG. 9 illustrates one embodiment of a terminal utilized in the present mobile trailer units, which terminal may be a point-of-sale terminal.

The customer terminal 142 shown in FIG. 9 includes a processing unit and storage device (not shown), a touch screen 144, a credit/debit card reading device 146 and wired/wireless devices 148, such as wired/wireless telephones, cellular or satellite telephones, or other wireless handsets, as well as portable computing devices capable of wireless communication. The processing unit controls the basic functions of the mobile terminal as dictated by programs available in the program storage/memory. The program storage/memory may include an operating system and program modules for carrying out functions and applications on the mobile terminal. The processor is also coupled to a user-interface element associated with the mobile terminal. The user-interface of the mobile terminal may include, for example, a display such as a liquid crystal display, a touch screen keypad, speaker, and microphone. These and other user-interface components are coupled to the processor as is well known in the art.

It is also understood that various modifications may be made to all of the various embodiments of the present invention without departing from the spirit and scope of the present invention.

Thus, there has been shown and described several embodiments of a mobile retail store which fulfills all of the objects and advantages sought therefor. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A mobile retail structure transportable to a plurality of different locations, the mobile retail structure comprising: a body section having front and rear end portions, a first side wall portion and a second side wall portion; an article storage system including a plurality of storage units for storing a plurality of different articles therewithin; a first entry means for allowing a customer to enter said body section, said first entry means being coupled to either one of said front and rear end portions of said body section; at least one second entry means for allowing a customer to enter said body section, said at least one second entry means being coupled to either one of said first and second side wall portions of said body section; and a walkway telescopically extendable outwardly from said at least one second entry means and being attachable to a similarly constructed adjacent mobile retail structure in the vicinity of said at least one second entry means wherein said walkway establishes a passageway to said adjacent mobile retail structure, said walkway being housed adjacent the bottom portion of said at least one second entry means.

2. The mobile retail structure of claim 1 further including an extendable canopy for enclosing the passageway between two adjacent mobile retail structures, said extendable canopy being coupled to said walkway.

3. The mobile retail structure of claim 1 wherein said walkway is receivable within an opening associated with the adjacent mobile retail structure.

4. The mobile retail structure of claim 1 further including a roll-up door for securing said first entry means.

5. The mobile retail structure of claim 1 wherein said article storage system further includes: a continuous track for supporting said plurality of storage units; means for driving said storage units; and a controller for automatically retrieving a desired storage unit responsive to commands from an external source.

6. The mobile retail structure of claim 1 wherein said body section is a trailer body.

7. The mobile retail structure of claim 1 wherein said first entry means includes a doorway formed in said rear end portion of said body section, and a removably attachable staircase for connecting to the rear end portion of said body section for providing access to said doorway.

8. The mobile retail structure of claim 7 wherein said body section includes a storage compartment located exterior thereof for storing said staircase when not in use.

9. The mobile retail structure of claim 1 wherein said at least one second entry means includes a pair of first and second entry means associated with said first and second side wall portions of said body section, said pair of second entry means being positioned and located in opposed relationship to each other.

10. The mobile retail structure of claim 1 further including a point-of-sales terminal for recording data related to articles stored in said article storage system, said point-of-sales terminal being positioned near said article storage system.

11. The mobile retail structure of claim 1 further including a customer terminal operable to provide a user with information relating to the different articles stored in said article storage system.

12. The mobile retail structure of claim 11 wherein said customer terminal is further operable to allow a user to select an article from said article storage system for retrieval.

13. The mobile retail structure of claim 12 wherein said customer terminal is further operable to accept payment for the selected article.

14. The mobile retail structure of claim 12 wherein said customer terminal is further operable to transmit instructions to said article storage system for movement thereof to allow for retrieval of the selected article.

15. The mobile retail structure of claim 11 wherein said customer terminal is in electronic communication with an Enterprise Resource Planning system.

16. The mobile retail structure of claim 15 wherein said customer terminal is operable to transmit information relating to the different articles stored in the article storage system to said Enterprise Resource Planning system, such information including information relating to at least one of the transactions, stock levels, payments, cash on hand and customer data associated with the articles stored in said article storage system.

17. The mobile retail structure of claim 1 including a generator associated with said body section for providing electrical power thereto.

18. A mobile retail structure transportable to a plurality of different locations, the mobile retail structure comprising: a body section having front and rear end portions, opposed side wall portions, and a floor portion extending therebetween; an article storage system including a plurality of storage units for storing a plurality of different articles therewithin; a first doorway for allowing a customer to enter said body section, said first doorway being associated with the rear end portion of said body section; a second doorway for allowing a customer to enter said body section, said second doorway being associated with one of said opposed side wall portions of said body section; a third doorway for allowing a customer to enter said body section, said third doorway being associated with the other of said opposed side wall portions of said body section; a first walkway extendable outwardly from said second doorway, said first walkway being attachable to a similarly constructed adjacent mobile retail structure in the vicinity of a third doorway associated with said similarly constructed mobile retail structure, said first walkway establishing a passageway to said adjacent mobile retail structure between the second doorway of one of said mobile retail structures and a third doorway of an adjacent mobile retail structure; a second walkway extendable outwardly from said third doorway, said second walkway being attachable to a similarly constructed adjacent mobile retail structure in the vicinity of a second doorway associated with said similarly constructed mobile retail structure, said second walkway establishing a passageway to said adjacent mobile retail structure between the third doorway of one of said mobile retail structures and the second doorway of an adjacent mobile retail structure; a first extendable canopy associated with said second doorway for enclosing the passageway formed between two adjacent mobile retail structures by said first extendable walkway, said first extendable canopy being coupled to said first extendable walkway; a second extendable canopy associated with said third doorway for enclosing the passageway formed between two adjacent mobile retail structures by said second extendable walkway, said second extendable canopy being coupled to said second extendable walkway; and a removably attachable staircase for connecting to the rear end portion of said body section for providing access to said first doorway.

19. The mobile retail structure of claim 18 wherein said first and second walkways are telescopically housed adjacent the bottom portion of each of said second and third doorways respectively.

20. The mobile retail structure of claim 18 including a door for securing each of said first, second and third doorways.

21. The mobile retail structure of claim 18 wherein said body section includes a storage compartment located exterior thereof for storing said staircase when not in use.

22. The mobile retail structure of claim 18 wherein said article storage system includes a continuous track for supporting said plurality of storage units, means for driving said storage units, and a controller for automatically retrieving a desired storage unit responsive to commands from an external source.

23. The mobile retail structure of claim 18 including a point-of-sales terminal for recording data related to articles stored in said article storage system, said point-of-sales terminal being positioned and located near said article storage system.

24. The mobile retail structure of claim 18 including a customer terminal operable to provide a user with information relating to the different articles stored in said article storage system.

25. The mobile retail structure of claim 24 wherein said customer terminal is further operable to allow a user to select an article from said article storage system for retrieval.

26. The mobile retail structure of claim 25 wherein said customer terminal is further operable to accept payment for the selected article.

27. The mobile retail structure of claim 25 wherein said customer terminal is further operable to transmit instructions to said article storage system for movement thereof to allow for retrieval of the selected article.

28. The mobile retail structure of claim 24 wherein said customer terminal is in electronic communication with an Enterprise Resource Planning system.

29. The mobile retail structure of claim 28 wherein said customer terminal is operable to transmit information relating to the different articles stored in said article storage system to said Enterprise Resource Planning system, such information including information relating to at least one of the transactions, stock levels, payments, cash-on-hand and customer data associated with the articles stored in said article storage system.

30. The mobile retail structure of claim 18 including a generator associated with said body section for providing electrical power thereto.

31. A system for distributing products to a mobile retail location comprising: at least one mobile retail structure transportable to a plurality of different locations, said at least one mobile retail structure including: a body section having front and rear end portions, and first and second side wall portions; an article storage system including a plurality of storage units for storing a plurality of different articles therewithin; a first entry means for allowing a customer to enter said body section, said first entry means being coupled to either one of said front and rear end portions of said body section; at least one second entry means for allowing a customer to enter said body section, said at least one second entry means being coupled to either one of said first and second side wall portions of said body section; a walkway extendable outwardly from said at least one second entry means, said walkway being attachable to a similarly constructed adjacent mobile retail structure in the vicinity of said at least one second entry means, said walkway establishing a passageway to said adjacent mobile retail structure; and an onboard computer system operable to track transactions and resulting stock levels; and an Enterprise Resource Planning system in communication with said onboard computer system to receive said transaction and stock level information, wherein said Enterprise Resource Planning system utilizes such transaction and stock level information to dispatch at least one of a restocking product shipment, a replacement mobile retail structure, and additional mobile retail structures to the location of said at least one mobile retail structure.

32. The system of claim 31 wherein said at least one mobile retail structure further includes an extendable canopy for enclosing the passageway between said two adjacent mobile retail structures, said extendable canopy being coupled to said walkway.

33. The system of claim 31 wherein said walkway is a telescopically extendable walkway housed adjacent the bottom portion of said at least one second entry means.

34. The system of claim 31 wherein said mobile retail structure further includes a door for securing the first entry means.

35. The system of claim 31 wherein said article storage system further includes: a continuous track for supporting said plurality of storage units; means for driving said storage units; and a controller for automatically retrieving a desired storage unit responsive to commands from an external source.

36. The system of claim 31 wherein the body section of said mobile retail structure is a trailer body.

37. The system of claim 31 wherein said first entry means includes a doorway formed in the rear end portion of said body section.

38. The system of claim 31 wherein said mobile retail structure further includes a point-of-sales terminal for recording data related to articles stored in said article storage system, said point-of-sales terminal being positioned near said article storage system.

39. The system of claim 31 wherein said onboard computer system is embodied in a customer terminal and is additionally operable to provide a user with information relating to the different articles stored in said article storage system.

40. The system of claim 39 wherein said customer terminal is further operable to allow a user to select an article from said article storage system for retrieval.

41. The system of claim 40 wherein said customer terminal is further operable to accept payment for the selected article.

42. The system of claim 40 wherein said customer terminal is further operable to transmit instructions to said article storage system for movement thereof to allow for retrieval of the selected article.

* * * * *